United States Patent [19]

Fukuma et al.

[11] Patent Number: 5,098,459
[45] Date of Patent: Mar. 24, 1992

[54] METHOD OF MANUFACTURING OPTICAL BRANCHING AND COUPLING DEVICE

[75] Inventors: Masumi Fukuma; Shuzo Suzuki, both of Kanagawa, Japan

[73] Assignee: Sumitomo Electric Industries, Ltd., Osaka, Japan

[21] Appl. No.: 379,202

[22] Filed: Jul. 13, 1989

[30] Foreign Application Priority Data

Jul. 13, 1988 [JP] Japan .................. 63-174323

[51] Int. Cl.$^5$ .................. C03B 37/14; B29D 11/00
[52] U.S. Cl. .................. 65/4.21; 264/1.5; 385/51
[58] Field of Search .................. 264/1.5; 350/96.15; 65/4.21

[56] References Cited

U.S. PATENT DOCUMENTS

| 4,291,940 | 9/1981 | Kawasaki et al. ............ 264/1.5 |
| 4,490,163 | 12/1984 | Jochem et al. ............ 350/96.15 |
| 4,514,057 | 4/1985 | Palmer et al. ............ 350/96.15 |
| 4,586,784 | 5/1986 | Tremblay et al. ............ 350/96.15 |
| 4,647,146 | 3/1987 | Karr, III et al. ............ 350/96.15 |
| 4,738,511 | 4/1988 | Fling ............ 350/96.15 |
| 4,772,085 | 9/1988 | Moore et al. ............ 350/96.15 |
| 4,822,128 | 4/1989 | Imoto et al. ............ 350/96.15 |
| 4,869,570 | 9/1989 | Yokohama et al. ............ 350/96.15 |

FOREIGN PATENT DOCUMENTS 63-205616 8/1988 Japan .
2204145 2/1988 United Kingdom .

OTHER PUBLICATIONS

P. Kopera et al., "Passive signal mode fiber components", Proceedings of the 36th Electronic Components Conference Seattle, Washington, 5th-7th May 1986, pp. 269-273, IEEE, New York, U.S.

P. Steinmann: "Schnelle Spleissverfahren fur Lichtwellenleiter", Siemens/Telcom Report. vol. 10, Mar. 1987, pp. 240-246, Erlangen, DE.

Patent Abstracts of Japan, vol. 8, no. 137 (P-282) [1574], 26th Jun. 1984; and JP-A-59 38 709 Hitachi 2-3-84.

K. Inada et al. "Splicing of fibers by the fusion method", IEEE Journal on Selected Areas in Communications vol. SAC-4, no. 5, Aug. 1986, pp. 706-713, New York, U.S.

Patent Abstracts of Japan, vol. 9, no. 257 (P-396) [1980], Oct. 15, 1985; and JP-A-60 107 606 Fujikura 6/13/85.

Primary Examiner—James Lowe
Attorney, Agent, or Firm—Cushman, Darby & Cushman

[57] ABSTRACT

A method of fabricating an optical branching and coupling device includes the steps of preparing at least a pair of coated optical fibers; partly stripping the coating of the optical fibers; and fixedly inserting the coating stripped portions of the optical fibers into a pair of comb-shaped grooves under a condition prior to a unification step which is free from tension and torsional stress in an optical axial direction to bring the coating stripped portions into contact with each other between the comb-shaped grooves. The method also includes the steps of melting the coating stripped portions thus contacting each other by heating to unify the coating stripped portions and extending the coating stripped portions in the optical axial direction while in the melted state.

7 Claims, 6 Drawing Sheets

| OPTICAL FIBER No. | BRANCHING RATIO (%) | | EXCESS LOSS (%) |
| --- | --- | --- | --- |
| | PORT 1 | PORT 2 | |
| 1 | 47 | 42 | 1 |
| 2 | 40 | 45 | 5 |
| 3 | 55 | 43 | 2 |
| 4 | 53 | 43 | 4 |

001
METHOD OF MANUFACTURING OPTICAL BRANCHING AND COUPLING DEVICE

BACKGROUND OF THE INVENTION

1. Field of the Invention

The present invention relates to a method of fabricating an optical branching and coupling, device which is accomplished by bringing coating partly stripped portions of a plurality of coated optical fibers into close contact with each other in a direction perpendicular to the optical axis, and unifying the coating stripped portions by melting them upon heating.

2. Prior Art

Optical branching and coupling devices may be classified by their components and functions into three groups: optical component utilization type, optical fiber utilization type and optical waveguide type. Of these, the optical fiber utilization type has advantages including that the number of components required is small because they can do away with the optical components such as lenses and their fabrication is easy, among others.

The conventional method of fabricating the optical fiber branching and coupling device of such an optical fiber utilization type will now be described. The methods of fabricating the optical branching and coupling device using an optical fiber can be roughly divided into a grinding method, etching method and melt-fusion method. The grinding method shaves off the clad part of the optical fiber and the core parts of the optical fibers are then allowed to be close with each other. The etching method immerses the clad parts of the optical fibers in a highly acidic or alkaline solution so as to be etched, and the clad parts thus etched are twisted to be brought close with each other.

Further, as to the melt-fusion method, there are two methods depending upon the conditions in arrangement of two optical fibers. The first method is one in which the coating of each of the two coated optical fibers is partly removed, and the two fibers thus coating-removed are twisted and melted by heating in such a manner that they are unified (disclosed in Stable Low-Loss Single Mode Couplers, Electronic Letters, Mar. 15, 1984, Vol. 20, No. 6, pp. 230-232. The second method is a method partly removes the coating of each of two optical fibers, arranges them in parallel, and melts them by a heating process so as to unify the melted portions thereof (disclosed in Japanese Patent Publication Gazette, No. 60-501427).

However, it is difficult to finish the fiber with an accuracy of the order of a micron by the grinding method and the etching method, so that their practicality does not amount too much at present.

Further, the conventional melt fusion method has been applied to melting and fusing two single-core coated optical fibers, and it has been difficult to be applied to branching and coupling a large number of optical fibers (for example, multi-core coated optical fibers) at one time.

In that case, a protective material for protecting the optical coupling portion is required for every pair of optical fibers so that a high density mounting is difficult.

SUMMARY OF THE INVENTION

It is, therefore, an object of the present invention is to provide a method of fabricating an optical branching and coupling device which enables fabrication of a large number of optical branching and coupling devices at one time, which enhances production efficiency and high-density packaging.

In order to attain the afore-mentioned object, in a method of fabricating an optical branching and coupling device which executes the fabrication by bringing a plurality of optical fibers whose coatings are partly stripped into close contact with each other in a direction perpendicular to the optical axis, and unifying the coating stripped portions by melting them on heating, the method of fabrication comprises a first step in which the coating stripped portions of a plurality of coated optical fibers are fixed by inserting them to a pair of comb-shaped grooves under conditions that are free from tension and torsional stress in the direction of the optical axis then, bringing the coating stripped parts of the optical fibers into close contact with each other in the direction of the optical axis between at least the pair of comb-shaped grooves, a second step in which the coating stripped portions are unified a heating and melting process, and a third step in which the coating stripped portions of the optical fibers are extended in the direction of the optical axis.

In this case, the use of an optical fiber having an asymmetric coating such as an elliptic or rectangular shape will prove effective.

Moreover, optical fibers may be made of those in which they are arranged in the form of a ribbon of coated optical fibers.

With the construction above described, according to the present invention, it becomes easy to bring a plurality of bare optical fibers to close contact in the first step, a sufficient surface extension effect can be secured between the coating stripped optical fibers in the second step, and the core parts of the coating stripped optical fibers can be made to come close to each other in the third step. Accordingly, it becomes easy to fabricate an optical branching and coupling device which can bring and couple a large number of bare optical fibers simultaneously.

DETAILED DESCRIPTION OF THE PREFERRED EMBODIMENTS

Figure 1A:
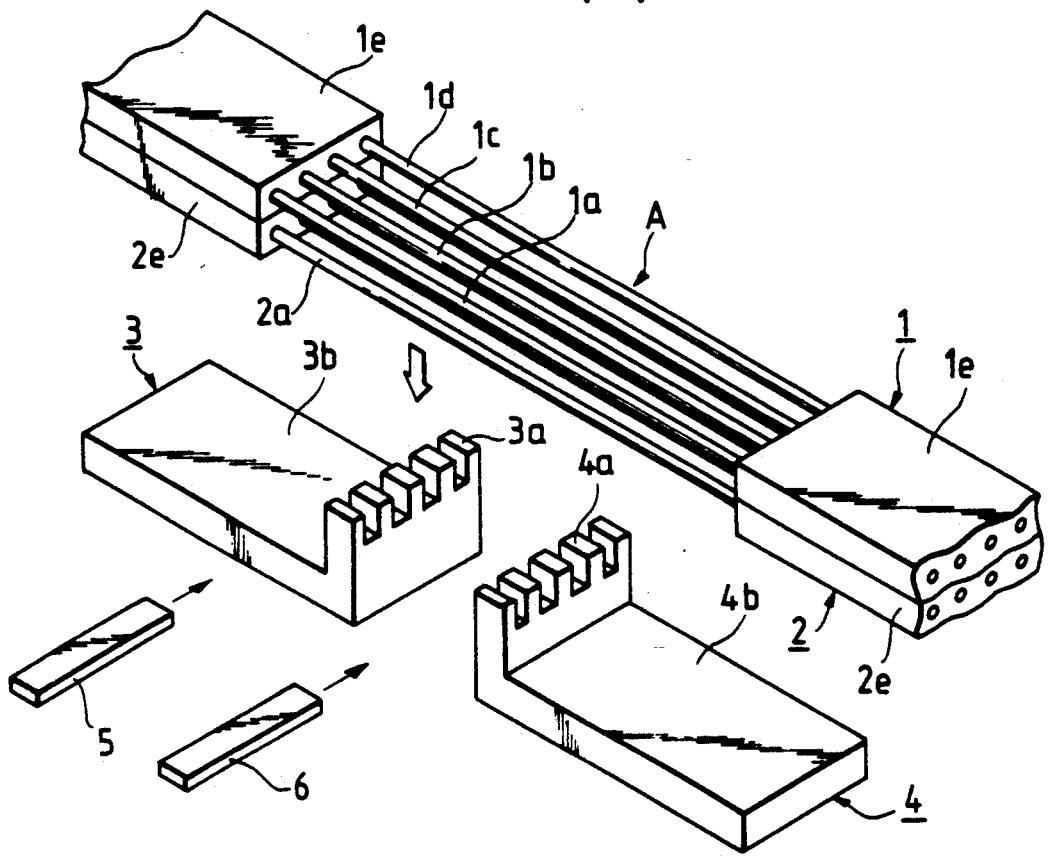
FIGS. 1(a) through 1(e) are process diagrams showing an embodiment of the method of fabricating an optical branching and coupling device in accordance with the present invention.
Figure 1B:
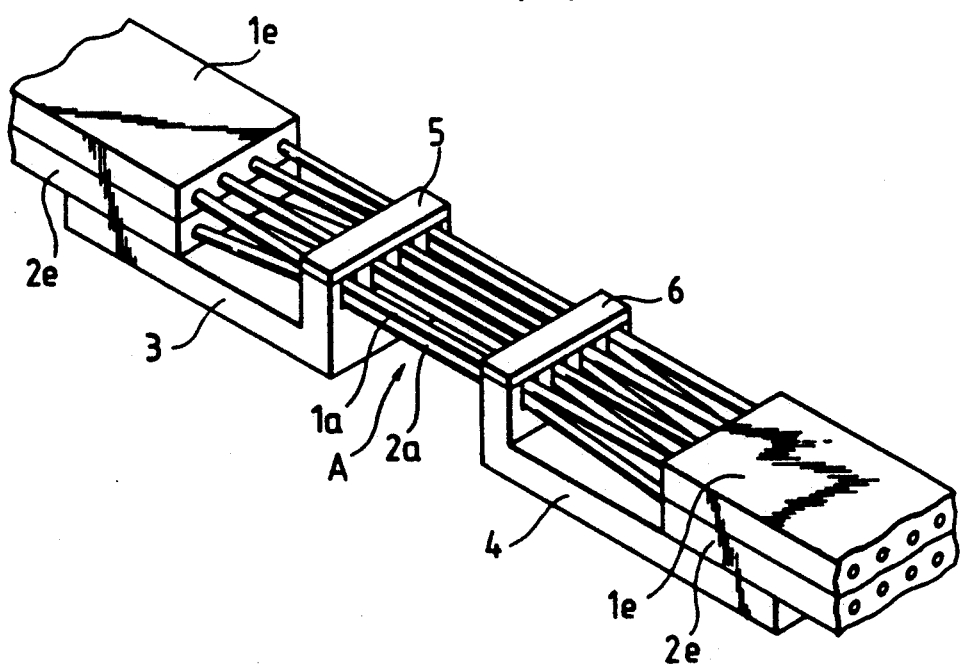
Figure 1C:
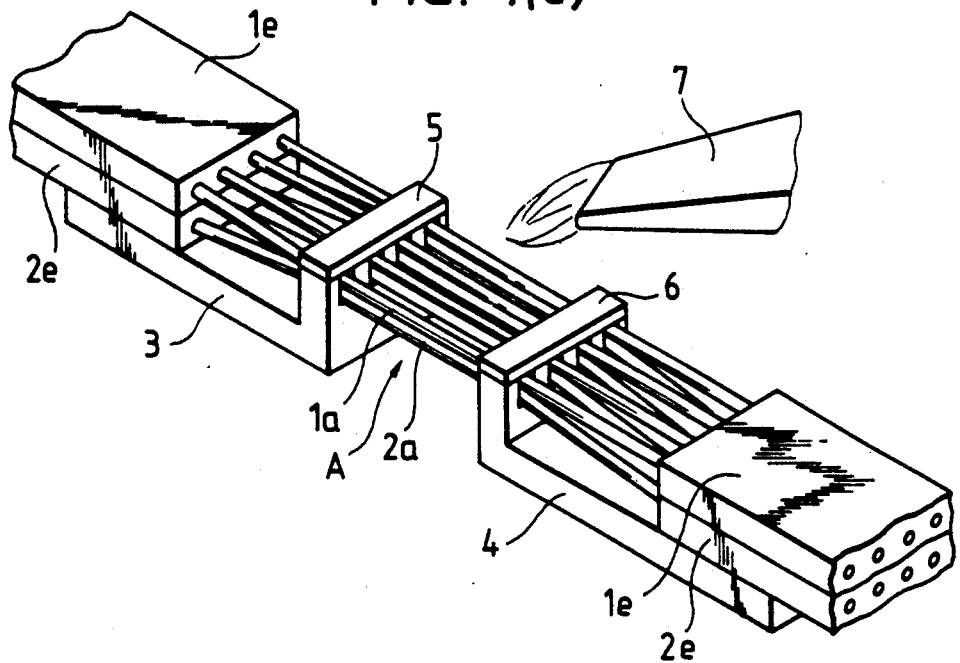

Referring to the accompanying drawings, an embodiment of the optical branching and coupling device in accordance with the present invention will be described below. In the description that follows, identical components are assigned identical symbols, and a repetitive explanation will be omitted.

FIGS. 1(a) through 1(e) are process charts showing an embodiment of the method of fabricating the optical branching and coupling device. The present invention comprises basically three processes.

First, ribbon-shaped coated optical fibers 1 and 2 with portions of the common coating stripped are laminated in a direction perpendicular to the surface of arrangement of the fibers. The coating part of the optical fiber of the ribbon-shaped coated optical fibers 1 and 2 are constructed in an asymmetric form (for instance, elliptic form) in order to avoid the generation of torsional stresses (to be described in detail later). The ribbon-shaped coated optical fiber is segmented as pieces of 1 m length, for example, and the coating at the central part of the segment is removed for 20 mm. The optical fiber whose coating is stripped is cleaned with alcohol or the like. Below the ribbon-shaped coated optical fibers 1 and 2 there are disposed a similar pair of block bodies 3 and 4 with a space therebetween, for example, of 15 mm. The block body 3 (or 4) is equipped with a comb like groove part 3a and a placing part 3b. The grooves of the comb-like groove part 3a are formed with the same pitch as that of bare optical fibers 1a, 1b, ... and 2a, 2b (not shown) ... enclosed in the ribbon shaped coated optical fibers 1 and 2, and the width of the grooves is roughly equal to the outer diameter of the optical fiber. In addition, the depth of the comb-like groove 3a depends upon the number of ribbon-shaped coated optical fibers to be laminated (to be branched and coupled). To the comb-like groove parts, 3a, there are inserted portions A which are the portions obtained by removing the common coatings, 1e and 2e from the coated fibers (referred to as "coating stripped portions", hereinafter), and on the placing part 3b there are placed the common coating 2e of the ribbon-shaped coated optical fiber 2.

In the first step, the coating stripped portions A of the ribbon-shaped coated optical fibers 1 and 2 are inserted into the comb-like groove parts 3a and 4a of the block bodies 3 and 4 under conditions free from tensions applied in the direction of the optical axes of the respective bare optical fibers 1a, 1b, ... and 2a, 2b (not shown), ..., and covers 5 and 6 are placed over the groove parts (FIG. 1(a)). The bare optical fibers 1a, 1b, ... and 2a, 2b (not shown), ... are fixed with respect to at least one direction perpendicular to the optical axes and are brought into close contact with each other between the comb-like groove parts 3a and 4a (FIG. 1b)).

Figure 1D:
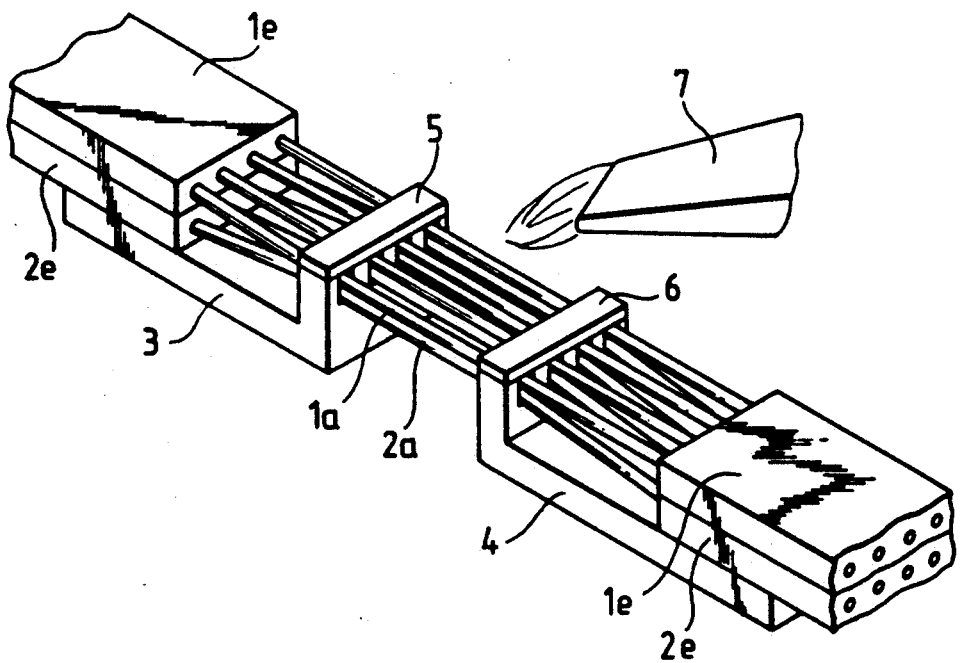
Figure 2A:
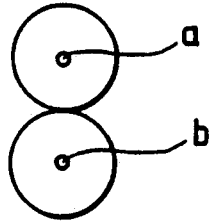
FIGS. 2(a) and 2(b) are sectional diagrams as seen along the direction of the optical axis illustrating the change in the optical fiber due to heating and melting.
Figure 2B:
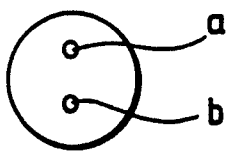

In the second step, the coating stripped portions A are melted by the application of heat from above with a mixed burner 7 of acetylene and oxygen so as to be unified for every pair of bare optical fibers (1a and 2a, for example) (FIG. 1(d)). In this case, it is possible to suppress the updraft due to heating from the burner 7 which might cause the bending of the optical fibers to melt the optical fibers from above. Since the tip of the burner 7 is given an elliptical form, all (namely, 4) of the optical fibers receive heat of the flame simultaneously at least in the direction of width of the ribbon-shaped coated optical fibers. When the bare optical fibers 1a, 1b, ..., and 2a, 2b (not shown), ... are melted sufficiently well, the cross-sectional form of the pair of optical fibers as seen from the direction of the optical axis changes under the action of surface tension from the shape of the letter 8 into that of a circle (see FIGS. 2(a) and 2(b)).

Figure 1E:
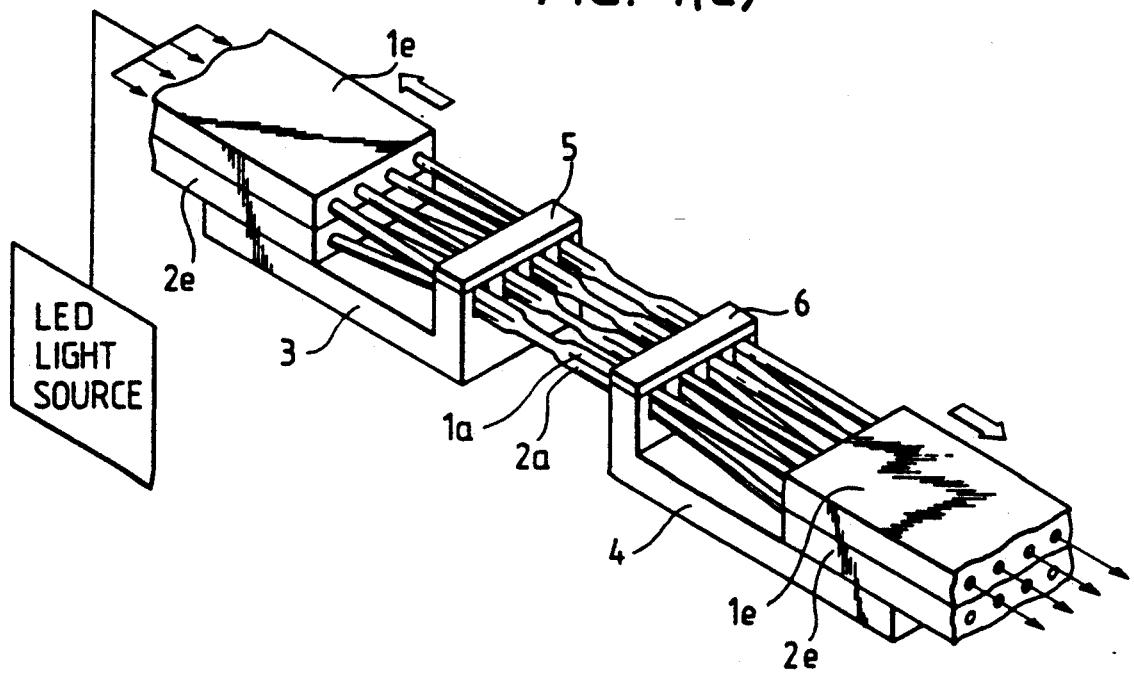

In the third step, the unified bare optical fibers 1a, 1b, ..., and 2a, 2b (not shown), ... are extended in the direction of the optical axis while the optical fibers are in the melted state (FIG. 1(e)). By extending the optical fibers in the direction of the optical axis, the outer form of the unified (changed into a circular form) two optical fibers (see FIG. 2(b)) becomes smaller and the respective core parts a and b come close to each other. As a result, an optical signal, which is propagated in one a of the core parts, can be branched and/or coupled to the other core part b that is adjacently located. In this case, an optical signal is made incident on an optical fiber on the left-hand side (optical fiber 1a, for example) from an LED light source (with wavelength of 1.3 μm) connected thereto, and the optical output power of exit light from the optical fibers on the right-hand side (optical fibers 1a and 2a, for example) are monitored with power meters or the like (not shown) to adjust the amount of extension of the optical fibers so as to obtain a prescribed branching ratio (50%, for example) (see FIG. 1(e)).

An optical branching and coupling device fabricated in accordance with the above-mentioned steps may be reinforced by molding, for example, the ribbon-shaped coated optical fibers themselves.

Further, for the optical fibers in the present embodiment that are brought into close contact by being inserted and fixed to the comb-like groove parts 3a and 4b (first step) and are unified by being heated and melted (second step), it is important that they are free from torsional stress and tension prior to the unification of the corresponding fibers during the melting step. The influence of torsional stress and tension will be described in reference to FIGS. 3 through 5.

Figure 3:
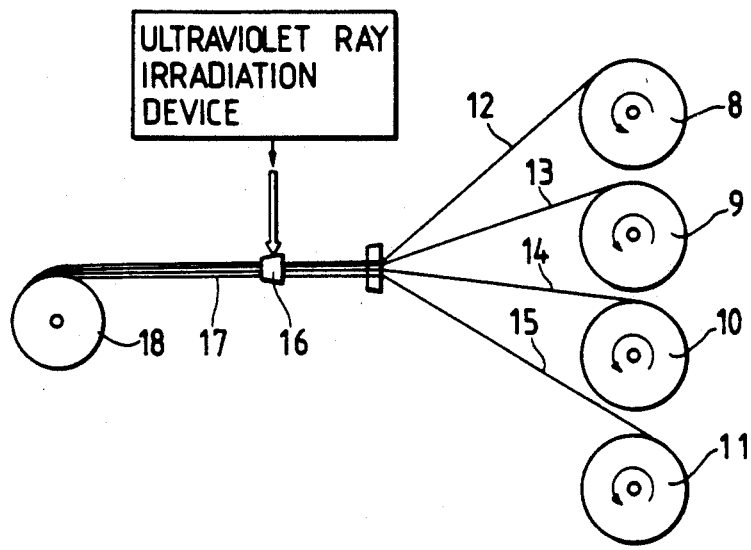
FIG. 3 is a schematic diagram showing the method of fabricating a ribbon-shaped coated optical fiber.

FIG. 3 shows a summary of the method of fabricating the ribbon-shaped coated optical fibers. Bare optical fibers 12, 13, 14 and 15 are supplied from a plurality of optical fiber bobbins 8, 9, 10 and 11, and they are passed through a die 16 after being gathered, and a ribbon-shaped coated optical fiber 17 is fabricated by unifying them with an ultraviolet curing resin. The ribbon-shaped coated optical fiber 17 thus fabricated is wound around a winding bobbin 18. The ribbon-shaped coated optical fibers are then laminated in two layers, a pair of optical fibers, are inserted into the comb-like groove, coating stripped portions A are brought into close contact and are heated to be melted.

Figure 4A:
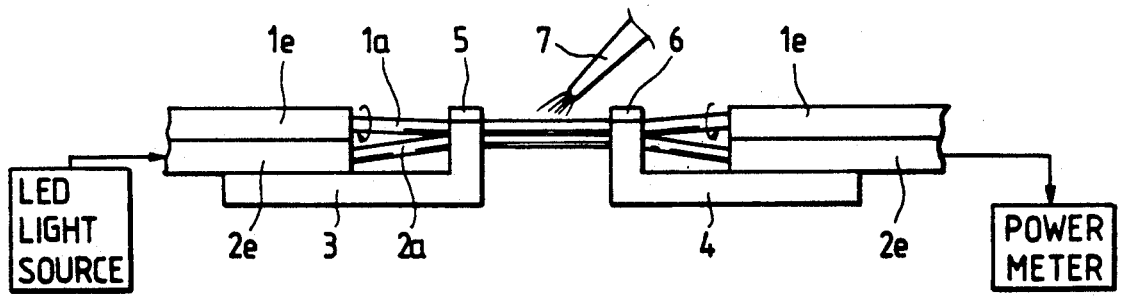
FIGS. 4(a) and 4(b) are process diagrams showing the influence of the torsional stress.
Figure 4B:
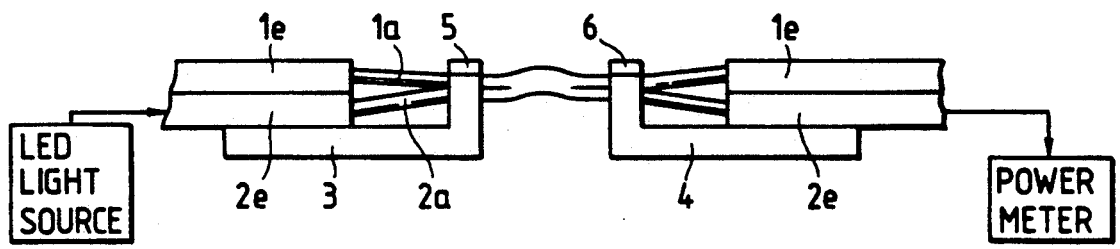

FIGS. 4(a) and 4(b) show the influence of torsional stress which illustrate the step diagrams in which the laminated ribbon-shaped coated optical fibers 1 and 2 are given torsional stress and are melted by heating. In this case, there is generated a sudden bend in the optical fibers 1 and 2 at the time of heating and melting (FIG. 4(b)), and the transmission loss increases suddenly. According to an experimental result on individual bare optical fiber, the transmission loss was 0.3–0.8 dB when there was applied no torsional stress, but increased to 3–4 dB when the fiber is heated and melted under the condition of applying a torsional stress. In this experiment, optical fiber with a difference of specific index of refraction of 0.3%, mode field diameter of 10 μm, cutoff wavelength of 1.2 μm and wavelength band of 1.3 μm, and an LED light source of 3 μm was used.

Figure 5A:
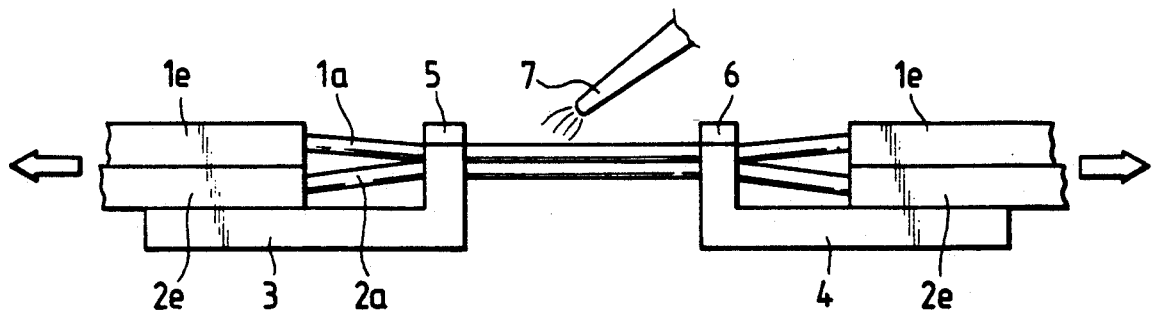
FIGS. 5(a) and 5(b) are process diagrams showing the influence of the tension.
Figure 5B:
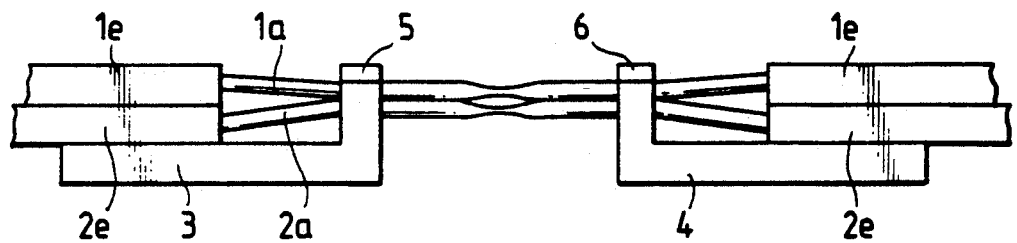

FIGS. 5(a) and 5(b) illustrate the influence of a tension, which show a process diagram when laminated ribbon-shaped coated optical fibers 1 and 2 are heated and melted with the application of a tension in the direction of the optical axis. In this case, the bare optical fibers 1 and 2 were respectively extended but were not unified (FIG. 5(b)).

As is apparent from the above result, when a torsional stress is applied to the optical fibers in the stage of heating and melting, the transmission loss is increased, and when a tension is applied it is not possible to unify them. For these reasons, care is exercised in the present invention so as not to apply a torsional stress or tension prior to the unification at the time of heating and melting.

First, in order to preclude the generation of a torsional stress in the optical fiber, use is made of an optical fiber in which the thickness of the coating in a first direction perpendicular to the direction of the optical axis and the thickness of the coating in a second direction perpendicular to the direction of the optical axis and which is also perpendicular to the first direction (namely, the cross-sectional structure of the coating of the optical fiber is asymmetric).

Figure 6A:
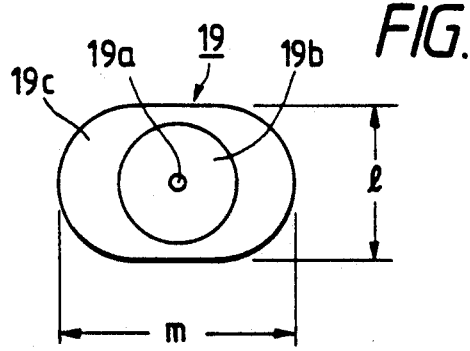
FIGS. 6(a) and 6(b) are sectional diagrams illustrating the structure of an optical fiber seen along the direction of the optical axis.
Figure 6B:
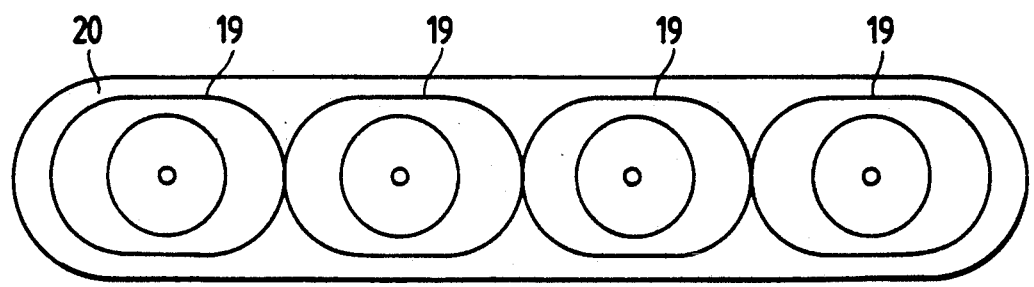

FIGS. 6(a) and 6(b) show structures of such a kind of optical fiber which are a sectional view as seen from the direction of the optical axis of an optical fiber whose cross section of coating is formed elliptically. FIG. 6(a) shows a single coated optical fiber, and FIG. 6(b) shows a ribbon-shaped coated optical fiber. An optical fiber 19 shown in FIG. 6(a) consists of a core part 19a, a clad part 19b and an elliptic coating part 19c, with the ratio m/l of the major axis (m) to the minor axis (l) being 3/2 (for instance, m=0.3 mm and l=0.2 mm). By forming the coating in an elliptic form it becomes easy to see the presence of a torsional condition in the core of the optical fiber and to prevent the arrangement of the optical fibers in a condition where they are twisted.

Further, the form and the ratio of the axes need not be limited to those in the present embodiment, and may be chosen appropriately as long as it enables the monitoring of the presence of a torsional condition in the core. Accordingly, the ratio l/m needs only be in the range of 40%-90%. If the ratio l/m is not greater than 40%, the fiber is retaken into its original shape due to surface tension even when it is squeezed into a predetermined shape using a die, while if it exceeds 90%, it becomes difficult to monitor the presence of a torsional condition in the core. In addition, a rectangular form may be adopted as the asymmetric form required. The optical fiber (FIG. 6(a)) ca be manufactured by the use of an ordinary single-mode optical fiber with the difference of specific refractive indices of 0.3%, mode field diameter 10 μm, cutoff wavelength 1.2 μm and wavelength band 1.3 μm, along with an elliptic die in order to form an elliptic cross-section of the coating.

FIG. 6(b) shows a ribbon-shaped coated optical fiber in which there are enclosed four bare optical fibers 19 arranged so as to have the direction of their major axes coincide with the arraying direction. Such a ribbon-shaped coated optical fiber can be used in the present embodiment shown in FIG. 1. This ribbon shaped coated optical fiber is obtained by arranging four bare optical fibers shown in FIG. 6(a) in a row and fixing them with a common coating 20. A ribbon-shaped coated optical fiber can be produced by providing a plurality of stepped rollers in the stage of ribbon-formation process (see FIG. 3) so as to have the cross-sectional direction of the respective bare optical fibers 19, 19, . . . aligned, and by the use of a line-gathering jig adapted to apply a constant tension to the optical fibers. By employing a ribbon-shaped coated optical fiber thus formed, it is possible to prevent the application of a torsional stress to the optical fibers at the time of heating and melting them.

Secondly, bare optical fibers of the ribbon-shaped coated optical fibers are fixedly inserted into a pair of comb-like grooves in such a way as to prevent the generation of a tension in the bare optical fibers. Since the ribbon-shaped coated optical fibers are free to move in this case at least in the direction of the optical axis, it is possible to bring the optical fibers into close contact between the comb-like grooves in a condition free from a tension in the direction of the optical axis, by inserting the optical fibers into the pair of comb-like grooves.

Figures 7, 8:
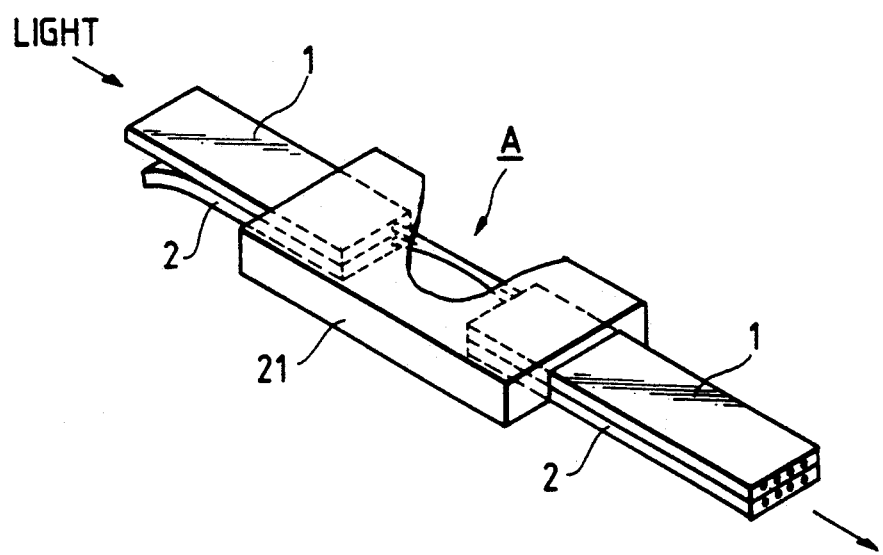
FIG. 7 is a perspective view of sectional diagram of important parts showing the experimental apparatus for the optical branching and coupling device in accordance with the present invention.
FIG. 8 is a table showing the result of experiment obtained by the use of the experimental apparatus of FIG. 7.

FIG. 7 shows an experimental apparatus for the optical branching and coupling device fabricated in accordance with the present embodiment. This apparatus makes use of a single-mode optical fiber with the difference of specific refractive indices of 0.3%, mode field diameter of 10 μm, cutoff wavelength of 1.2 μm and wavelength band of 1.3 μm. The apparatus is molded with a quartz glass case 21 after the optical fibers are unified by heating and melting. Further, the light branching ratio of the apparatus is set to be 50%. An LED light source (not shown) with wavelengths of 1.3 μm is connected to the ribbon-shaped coated optical fiber 1 on the left-hand side, and power meters (not shown) are connected to the ribbon-shaped coated optical fibers 1 and 2 on the right-hand side, respectively.

FIG. 8 shows the experimental result obtained by the use of the experimental apparatus of FIG. 7. In the experiment, the power of the incident light on the ribbon-shaped coated optical fiber 1 is represented by $P_0$, the powers of exit radiations from the ribbon-shaped coated optical fibers 1 and 2 are represented by $P_1$ and $P_2$, respectively, the branching ratios are represented by $100 \times P_1/P_0$ (%) and $100 \times P_2/P_0$ (%), and the excess loss is represented by $100 \times (P_0 - P_1 - P_2)/P_0$. It should be noted that the branching ratio is computed based on the measurement values at the incidence position (referred to as "port 0" hereinafter) of radiation in the -ribbon shaped coated optical fiber 1 and at the exit positions (referred to as "port 1" and "port 2" hereinafter) of radiation in the ribbon-shaped coated optical fibers 1 and 2.

According to the experimental result obtained by the use of the experimental apparatus, it was found that the dispersion in the branching ratio in the individual bare optical fibers was within only 10% and the excess loss thereof was within 5%.

With the present invention thus explained, it is possible to fabricate a plurality of branching and coupling devices in a single operation with satisfactorily high accuracy. In addition, the method can also be applied to ribbon-shaped coated optical fibers, enabling the fabrication of a high density branching and coupling device. In particular, the method will be effective when mounting a large number of branching and coupling devices in a single operation.

Accordingly, it is possible to realize an enhancement of the production efficiency and high density packaging.

What is claimed is:

1. A method of fabricating an optical branching and coupling device, comprising the steps of:

preparing at least a pair of coated optical fibers;

partly stripping the coating of said optical fibers;

fixedly inserting the coating stripped portions of said optical fibers into a pair of comb-shaped grooves under a condition prior to unification of the coating stripped portions in a melting step which is free from tension and torsional stress in the optical axial direction and simultaneously exerting both a controlling horizontal force and a controlling vertical force at the same axial position on the coating striped portions to bring said coating stripped portions into controlled contact with each other between said comb-shaped grooves;

melting said coating stripped portions thus contacting each other by heating to unify said coating stripped portions; and extending said coating stripped portions in said optical axial direction while said coating stripped portions are in said melted, unified state.

2. The method as claimed in claim 1, wherein said coated optical fibers include an asymmetric coating, the thickness of which in a first direction perpendicular to the optical axial direction is different from that in a second direction perpendicular to both of said optical axial direction and said first direction.

3. The method as claimed in claim 2, wherein said asymmetric coating has an elliptic cross-section.

4. The method as claimed in claim 2, wherein said asymmetric coating has a rectangular cross-section.

5. The method as claimed in claim 1, wherein said coated optical fibers comprise a pair of ribbon-shaped coated optical fibers.

6. The method as claimed in claim 1, further comprising the step of adjusting the quantity of extension of said optical fibers to obtain a predetermined branching ratio.

7. The method as claimed in claim 1, further comprising the step of recoating said coating stripped portions subsequent to the extending step.

* * * * *